US 12,552,191 B2

(12) United States Patent
Mizuno (10) Patent No.: US 12,552,191 B2
(45) Date of Patent: Feb. 17, 2026

(54) IMAGE FORMING METHOD, IMAGE-FORMED ARTICLE MANUFACTURING METHOD, AND IMAGE FORMING SYSTEM

(71) Applicant: BROTHER KOGYO KABUSHIKI KAISHA, Nagoya (JP)

(72) Inventor: Nao Mizuno, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 178 days.

(21) Appl. No.: 18/353,360

(22) Filed: Jul. 17, 2023

(65) Prior Publication Data

US 2024/0025186 A1 Jan. 25, 2024

(30) Foreign Application Priority Data

Jul. 20, 2022 (JP) ................................ 2022-115210

(51) Int. Cl.
*B41M 7/00* (2006.01)
*B41M 5/00* (2006.01)

(52) U.S. Cl.
CPC .......... *B41M 7/009* (2013.01); *B41M 5/0011* (2013.01); *B41M 5/0017* (2013.01)

(58) Field of Classification Search
CPC ... B41M 7/009; B41M 5/0011; B41M 5/0017
See application file for complete search history.

(56) References Cited

U.S. PATENT DOCUMENTS

| 5,609,671 | A | 3/1997 | Nagasawa |
| 2004/0005155 | A1 | 1/2004 | Miyazaki |
| 2008/0241398 | A1 | 10/2008 | Kato et al. |
| 2015/0165739 | A1 | 6/2015 | Taniuchi |
| 2015/0210055 | A1 | 7/2015 | Pervan |
| 2023/0044967 | A1* | 2/2023 | Niizuma ............. C09D 11/322 |

FOREIGN PATENT DOCUMENTS

| JP | H08-3498 | A | 1/1996 |
| JP | 2000513396 | A | 10/2000 |
| JP | 2003055886 | A | 2/2003 |
| JP | 2004090619 | A | 3/2004 |
| JP | 2008524400 | A | 7/2008 |
| JP | 2008246821 | A | 10/2008 |
| JP | 2009515007 | A | 4/2009 |
| JP | 2011515535 | A | 5/2011 |

(Continued)

OTHER PUBLICATIONS

Extended European Search Report issued Nov. 9, 2023 in European Patent Application No. 23186550.2, 12 pages.

*Primary Examiner* — Geoffrey S Mruk
(74) *Attorney, Agent, or Firm* — Element IP, PLC (57) ABSTRACT

An image forming method includes: applying a resin powder to a first area of an object to be subjected to image forming; applying a water-based ink comprising pigments to a second area of the object by an inkjet method to form an image, the first area and the second area at least partially overlapping each other; and heating the first area and the second area to fix the resin powder and the water-based ink to the object. By contact with the resin powder, the water-based ink either thickens, or causes an aggregation of the pigments.

20 Claims, 1 Drawing Sheet

(56) References Cited

FOREIGN PATENT DOCUMENTS

| WO | WO-97048769 A1 | 12/1997 |
|----|----------------|---------|
| WO | WO-2006066132 A2 | 6/2006 |
| WO | WO-2006066132 A3 | 6/2006 |
| WO | WO-2007053564 A2 | 5/2007 |
| WO | WO-2007053564 A3 | 5/2007 |
| WO | WO-2009117071 A1 | 9/2009 |

* cited by examiner

IMAGE FORMING METHOD, IMAGE-FORMED ARTICLE MANUFACTURING METHOD, AND IMAGE FORMING SYSTEM

REFERENCE TO RELATED APPLICATIONS

This application claims priority from Japanese Patent Application No. 2022-115210 filed on Jul. 20, 2022. The entire disclosure of the Japanese Patent Application is incorporated herein by reference.

BACKGROUND ART

The present disclosure relates to an image forming method, image-formed article manufacturing method, and image forming system.

There is a known conventional method for applying a pretreating agent (or pretreating liquid) to an object to be subjected to image forming prior to printing in order to prevent ink bleeding (Japanese Unexamined Patent Application Publication No. 2003-55886).

DESCRIPTION

According to an aspect of the present disclosure, an image forming method includes: applying a resin powder to a first area of an object to be subjected to image forming; applying a water-based ink comprising pigments to a second area of the object by an inkjet method to form an image, the first area and the second area at least partially overlapping each other; and heating the first area and the second area to fix the resin powder and the water-based ink to the object. By contact with the resin powder, the water-based ink either thickens, or causes an aggregation of the pigments.

According to another aspect of the present disclosure, a method for manufacturing an image-formed article includes forming an image by the above-described image forming method, to obtain the image-formed article.

According to a further aspect of the present disclosure, an image forming system includes: a water-based ink; an ink flow path configured to have the water-based ink pass therethrough; a resin powder; a resin powder reservoir configured to store the resin powder; an inkjet head configured to apply the water-based ink supplied into the ink flow path to a first area of an object to be subjected to image forming; and a photoreceptor drum configured to apply the resin powder stored in the resin powder reservoir to the object, the first area and the second area at least partially overlapping each other. The water-based ink comprises pigments, and by contact with the resin powder, the water-based ink either thickens, or causes an aggregation of the pigments.

Figure 1:
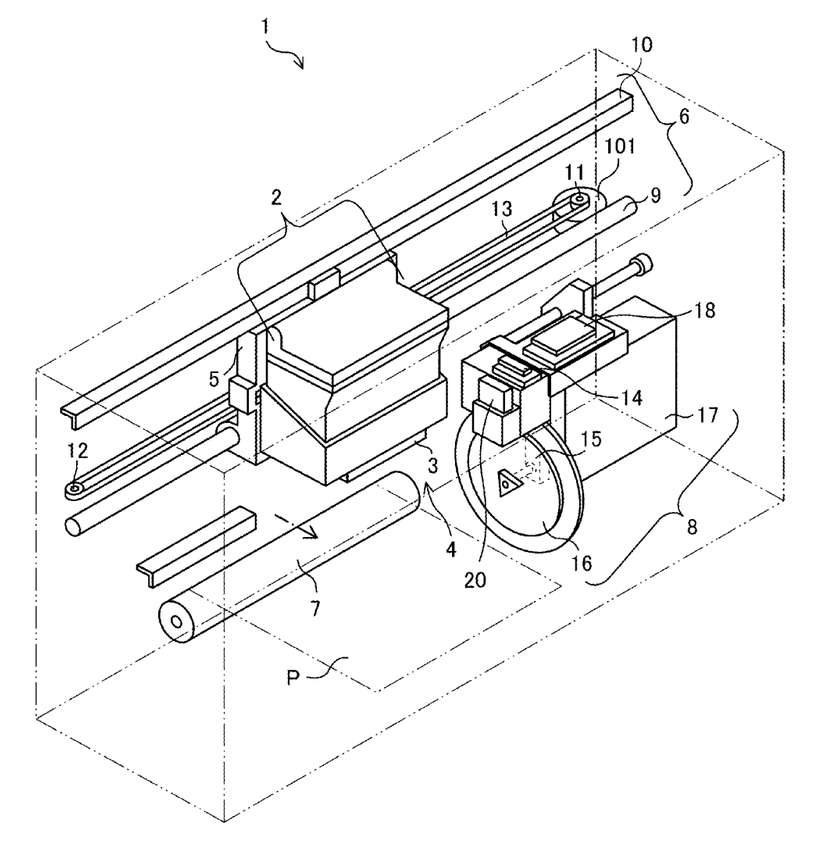
The FIGURE is a schematic perspective view illustrating an exemplary inkjet recording device.

Embodiments of the present disclosure will now be described more fully hereinafter with reference to the accompanying drawing, in which some, but not all of the embodiments of the disclosure are shown.

A pretreating agent like that described above contains polyvalent metal salts, which do not volatilize, and thus tend to remain even after drying, causing pretreating traces of pretreating agent to remain.

The image forming method according to the present disclosure includes; a resin powder applying step that applies a resin powder to an object to be subjected to image forming; an image forming step that uses an inkjet method to apply a water-based ink to an area in which the resin powder was applied; and a thermal fixing step that applies heat to the area in which the resin powder was applied and the area in which the water-based ink was applied to fix the resin powder and the water-based ink to the object, wherein the water-based ink contains a pigment and is either thickened, or the pigment in the water-based ink is aggregated, by contact with the resin powder.

The image forming method, image-formed article manufacturing method, and image forming system according to the present disclosure are without both pretreating traces due to a pretreating agent, and ink bleeding.

As used herein, the words "a" and "an" and the like carry the meaning of "one or more." When an amount, concentration, or other value or parameter is given as a range, and/or its description includes a list of upper and lower values, this is to be understood as specifically disclosing all integers and fractions within the given range, and all ranges formed from any pair of any upper and lower values, regardless of whether subranges are separately disclosed. Where a range of numerical values is recited herein, unless otherwise stated, the range is intended to include the endpoints thereof, as well as all integers and fractions within the range. As an example, a stated range of 1-10 fully describes and includes the independent subrange 3.4-7.2 as does the following list of values: 1, 4, 6, 10.

In the present disclosure, "mass" may be read as "weight" unless otherwise specified. For example, unless otherwise specified, "mass ratio" may be read as "weight ratio" and "mass %" may be read as "weight %."

In the present disclosure, "pigment" includes, at least, either a "resin dispersed pigment" and a "self-dispersing pigment" unless otherwise specified. The resin dispersed pigment is, for example, a pigment in which a pigment particle can be dispersed in a solvent by a resin dispersing agent. Additionally, the self-dispersing pigment is one in which pigment particles can be dispersed in a solvent without using a resin dispersing agent.

Examples of the resin dispersed pigment include carbon black, inorganic pigments, organic pigments, and the like. Examples of the above carbon black include furnace black, lamp black, acetylene black, channel black, and the like. Examples of the above inorganic pigments include titanium oxide, iron oxide-based inorganic pigments, carbon black-based inorganic pigments, and the like. Examples of the above organic pigments include azo pigments such as azo lakes, insoluble azo pigments, condensed azo pigments, and chelate azo pigments, and the like; polycyclic pigments such as phthalocyanine pigments, perylene and perinone pigments, anthraquinone pigments, quinacridone pigments, dioxazine pigments, thioindigo pigments, isoindolinone pigments, quinophthalone pigments, and the like; dye lake pigments such as basic dye lake pigments, acid dye lake pigments, and the like; nitro pigments; nitroso pigments; aniline black daylight fluorescent pigments, and the like. Any other pigment that is dispersible in the aqueous phase may also be used. Specific examples of such pigments include C.I. pigment black 1, 6, and 7; C.I. pigment yellow 1, 2, 3, 12, 13, 14, 15, 16, 17, 55, 74, 78, 150, 151, 154, 180, 185, and 194; C.I. pigment orange 31 and 43; C.I. pigment red 2, 3, 5, 6, 7, 12, 15, 16, 48, 48:1, 53:1, 57, 57:1, 112, 122, 123, 139, 144, 146, 149, 150, 166, 168, 175, 176, 177, 178, 184, 185, 190, 202, 209, 221, 222, 224, and 238; C.I. pigment violet 19 and 196; C.I. pigment blue 1, 2, 3, 15, 15:1, 15:3, 15:4, 16, 22, and 60; C.I. pigment green 7 and 36; and solid solutions of these pigments, and the like.

For example, a general polymer dispersing agent (also referred to as a pigment dispersing resin, a resign dispersing agent, or the like) may be used as the resin dispersing agent, or the agent may be prepared in-house. Furthermore, the pigment may be one that is encapsulated by a polymer in the water-based ink according to the present disclosure. For example, an agent containing at least a methacrylic acid or an acrylic acid as a monomer, for example, a commercially available agent may be used as the resin dispersing agent. The resin dispersing agent may be, for example, a hydrophobic monomer such as styrene, a styrene derivative, vinylnaphthalene, a vinylnaphthalene derivative, an aliphatic alcohol ester of α,β-ethylenically unsaturated carboxylic acid, and the like; or a block copolymer, a graft copolymer, or a random copolymer consisting of two or more monomers selected from a group consisting of acrylic acid, acrylic acid derivatives, maleic acid, maleic acid derivatives, itaconic acid, itaconic acid derivatives, fumaric acid, and fumaric acid derivatives; or salts of these, and the like. Examples of the above commercially available agent include "Joncryl® 611," "Joncryl® 60," "Joncryl® 586," "Joncryl® 687," "Joncryl® 63," and "Joncryl® HPD296" manufactured by Johnson Polymers, Co., Ltd.; "Disperbyk 190" and "Disperbyk 191" manufactured by BYK Chemie Co., Ltd.; and "Solsperse 20000" and "Solsperse 27000" manufactured by Zeneca Co., Ltd., and the like.

Examples of methods for dispersing the pigment using the pigment dispersing resin include dispersing the pigment using a dispersing device. The dispersing device used to disperse the pigment may be any general dispersing machine, and examples include a ball mill, a roll mill, a sand mill (for example, a high speed model), or the like.

The self-dispersing type pigment is a pigment that is made dispersible in water without the use of dispersants by introducing, for example, at least one type of hydrophilic functional group such as a carbonyl group, hydroxyl group, carboxylic acid group, sulfonic acid group, phosphoric acid group, and the like, and salts of these, in pigment particles through chemical bonding, either directly or through another group. A pigment processed using the method disclosed in, for example, Japanese Unexamined Patent Application Publication No. H08-3498 (corresponding to EP 0688836), Japanese Unexamined Patent Application Publication (Translation of PCT Application) No. 2000-513396 (corresponding to U.S. Pat. No. 5,837,045), Japanese Unexamined Patent Application Publication (Translation of PCT Application) No. 2008-524400 (corresponding to US 2006/201380), Japanese Unexamined Patent Application Publication (Translation of PCT Application) No. 2009-515007 (corresponding to US 2007/100023), and Japanese Unexamined Patent Application Publication (Translation of PCT Application) No. 2011-515535 (corresponding to US 2009/229489), or the like may be used as the self-dispersing type pigment. Note that the contents of these documents are incorporated herein by reference in their entireties. An inorganic pigment or an organic pigment may be used as raw material for the self-dispersing type pigment. Furthermore, examples of pigments suitable for performing the above processing include carbon black, and the like, such as "MA8," "MA100," and the like, manufactured by Mitsubishi Chemical Co., Ltd. The self-dispersing type pigment may also be, for example, a commercially available product. Examples of the commercially available product include "CAB-O-JET® 200," "CAB-O-JET® 250C," "CAB-O-JET® 260M," "CAB-O-JET® 270Y" "CAB-O-JET® 300," "CAB-O-JET® 400," "CAB-O-JET® 450C," "CAB-O-JET® 465M," and "CAB-O-JET® 470Y" manufactured by Cabot Corporation; "BONJET® BLACK CW-2," and "BONJET® BLACK CW-3" manufactured by Orient Chemical Industries Co., Ltd.; "LIOJET® WD BLACK 002C" manufactured by Toyo Ink Manufacturing Co., Ltd., and the like.

A pigment solid content of the pigment in the total amount of the water-based ink is, for example, 0.5 mass % to 20 mass %, preferably 1 mass % to 10 mass %, and more preferably 3 mass % to 5 mass %.

The water-based ink may also contain a water-soluble organic solvent. Examples of the water-soluble organic solvent include a wetting agent that prevents ink from drying out at a nozzle tip of an inkjet head and a penetrant that adjusts a drying speed on a recording medium.

Examples of the wetting agent include lower alcohols such as methyl alcohol, ethyl alcohol, n-propyl alcohol, isopropyl alcohol, n-butyl alcohol, sec-butyl alcohol, tert-butyl alcohol, and the like; amides such as dimethylformamide, dimethylacetamide, and the like; ketones such as acetone, and the like; keto alcohols such as diacetone alcohol, and the like; ethers such as tetrahydrofuran, dioxane, and the like; polyethers such as polyalkylene glycol, and the like; polyhydric alcohols such as alkylene glycol, glycerin, trimethylolpropane, trimethylolethane, and the like; 2-pyrrolidone; N-methyl-2-pyrrolidone; 1,3-dimethyl-2-imidazolidinone; and the like. Examples of the polyalkylene glycol include polyethylene glycol, polypropylene glycol, and the like. Examples of the alkylene glycol include ethylene glycol, propylene glycol, butylene glycol, diethylene glycol, triethylene glycol, dipropylene glycol, tripropylene glycol, thiodiglycol, hexylene glycol, and the like. Either one type of these wetting agents may be used alone, or two or more types thereof may be used together. Among these, polyhydric alcohols such as alkylene glycol, glycerin, and the like, are preferred.

An amount of the wetting agent contained in the total amount of the water-based ink is, for example, 0 mass % to 30 mass %, preferably 5 mass % to 20 mass %, and more preferably 10 mass % to 15 mass %.

Examples of the penetrant include glycol ether compounds and alkylene diols. Examples of the glycol ether compounds include ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, tripropylene glycol-n-butyl ether, and the like. Examples of alkylene diols include 1,2-hexanediol, 1,2-heptanediol, 1,3-propanediol, 1,2-butanediol, 1,3-butanediol, 1,4-butanediol, 2,3-butanediol, 3-methyl-1,3-butanediol, 1,3-propanediol, 1,2-butanediol, 1,2-pentanediol, 1,4-butanediol, 1,5-pentanediol, 1,6-hexane diol, 2-methyl-2,4-pentanediol, 3-methyl-1,5-pentanediol, and the like. Either one type of these penetrants may be used alone, or two or more types thereof may be used together.

An amount of the penetrant contained in the total amount of the water-based ink is, for example, 0 mass % to 20 mass %, 0 mass % to 15 mass %, or 5 mass % to 15 mass %.

The water-soluble organic solvent is preferably liquid at, for example, the melting point of the resin powder. If the water-soluble organic solvent is not liquid (that is, volatilizes) at the melting point of the resin powder, the solvent will not readily mix with the water-based ink and the resin powder. On the other hand, if the water-soluble organic solvent is liquid at the melting point of the resin powder, a binder resin in the resin powder will enter into the water-based ink and increase a volume of resin in the water-based ink. This enhances the fixability and abrasion resistance of the water-based ink.

A boiling point of the water-soluble organic solvent may be 200° C. or more, 250° C. or more, or 270° C. or more.

The water-based ink may also contain a fixing resin. Examples of the fixing resin include water-soluble resins, resin emulsions, or the like.

Examples of the water-soluble resin include resins having structures with relatively high hydrophilic contents and that are soluble in water. Examples of the water-soluble resin include urethane resins, polyester resins, acrylic resins, alkyd resins, styrene-maleic acid copolymers, cellulose derivatives, polyvinylpyrrolidone, polyvinyl alcohol, and the like. Either one type of these water-soluble resins may be used alone, or two or more types thereof may be used together. The water-soluble resin is preferably a urethane resin, a polyester resin, or an acrylic resin, and a urethane resin is preferable in terms of enhanced abrasion resistance.

The resin emulsion is, for example, configured of fine resin particles and a dispersing medium (for example, water), and the fine resin particles are not dissolved in the dispersing medium, but dispersed with a specific particle size. Examples of the resin emulsion include acrylic resin emulsions, urethane resin emulsions, polyester resin emulsions, polystyrene resin emulsions, polyethylene resin emulsions, vinyl chloride resin emulsions, and the like. Either one type of these resin emulsions may be used alone, or two or more types thereof may be used together. The aqueous resin emulsion is preferably an acrylic resin emulsion, a urethane resin emulsion, or a polyester resin emulsion, and a urethane resin emulsion is preferable in terms of enhanced abrasion resistance.

The resin emulsion may be, for example, a commercially available one. Examples of those that are commercially available include the polycarbonate urethane resin emulsions "SuperFlex® 460" manufactured by DK S Co., Ltd., "TAKELAC® W-6110" manufactured by Mitsui Chemicals Co., Ltd., and "HYDRAN® WLS-210" manufactured by DIC Co., Ltd., and the like; the polyester urethane resin emulsions "UCOAT® UWS-145" manufactured by Sanyo Chemical Industries, Ltd., "TAKELAC® W-5030" manufactured by Mitsui Chemicals Co., Ltd., and "HYDRAN® HW-920" manufactured by DIC Co., Ltd., and the like; and the polyether urethane resin emulsions "TAKELAC® W-6061T" manufactured by Mitsui Chemicals Co., Ltd., "HYDRAN® FCS-855" and "HYDRAN® WLS-201" manufactured by DIC Co., Ltd., and the like.

A lower limit of solid content of the fixing resin with respect to the total amount of the water-based ink is, for example, 5 mass % or more, and preferably 7 mass % or more. An upper limit of solid content of the fixing resin is, for example, 20 mass % or less, preferably 15 mass % or less, and more preferable 10 mass % or less.

The water-based ink may also contain a surfactant. Examples of the surfactant include nonionic surfactants and anionic surfactants. Here, for example, if the resin powder is cationic, the pigment contained in the water-based ink is anionic, and a nonionic surfactant is used as a surfactant, the water-based ink will permeate the object to be subjected to image forming, which will result in the pigment also entering inside the object to be subjected to image forming from a surface thereof. On the other hand, if an anionic surfactant is used as a surfactant, the cationic resin powder and the surfactant will react with one another on the surface of the object to be subjected to image forming, which will result in the pigment also remaining on the surface of the object to be subjected to image forming, enhancing image quality (OD value). Accordingly, it is preferable that an anionic surfactant be used as the surfactant.

The nonionic surfactant may also be, for example, a commercially available product. Examples of commercially available products include "OLFINE® E1004," "OLFINE® E1006," and "OLFINE® E1010" manufactured by Nissin Chemical Co., Ltd., and the like.

Any anionic surfactant having only one anionic group in molecules thereof, for example, a commercially available one, may be used. Commercially available anionic surfactants include "BEAULIGHT® ECA" (sodium polyoxyethylene tridecyl ether acetate) and "BEAULIGHT® LCA25N" (sodium polyoxyethylene lauryl ether acetate) manufactured by Sanyo Chemical Industries, Ltd.; "Energycol® EC-30" (polyoxyethylene lauryl ether sodium acetate) and "Sunnol® NL1430" (sodium polyoxyethylene alkyl ether sulfate) manufactured by Lion Specialty Chemicals Co., Ltd.; and "NEOPELEX® G25" (sodium decylbenzenesulfonate (soft type)) manufactured by Kao Corporation; and the like.

The surfactant may also contain surfactants other than nonionic surfactants and anionic surfactants (for example, cationic surfactants, amphoteric surfactants, and the like), however, a nonionic surfactant or an anionic surfactant alone may be used as the surfactant.

An amount of the surfactant contained in the total amount of the water-based ink is, for example, 0.1 mass % to 2 mass %, preferably 0.3 mass % to 1.5 mass %, and more preferably mass % to 1 mass %.

The water-based ink may also contain water, a pH adjusting agent, a viscosity modifying agent, a surface tension modifying agent, an antifungal agent, a cross-linking agent, and the like.

It is preferable that the water be deionized water or pure water. The amount of the water contained in the total amount of the water-based ink is, for example, 10 mass % to 90 mass %, and preferably 20 mass % to 80 mass %. An amount of contained water may be, for example, the balance of other components.

In the present disclosure, "resin powder" refers to a powder containing resin as a main component. The resin powder may contain, for example, components such as a binder resin, a release agent, a charge control agent, an external additive, and the like. Note that there are substances containing binder resins, release agents, charge control agents, external additives, pigments, and the like, that are used as toners for printing, and that resin powder may be obtained by removing the pigments from such toners.

The binder resin may be, for example, a thermoplastic resin. Examples of the thermoplastic resin include polyester resins, and the like. The polyester resin may have an acid value of, for example, 0.5 to 40 mg KOH/g, and preferably 1.0 to 20 mg KOH/g. Furthermore, a weight average molecular weight (according to GPC measurement using standard polystyrene as a calibration curve) thereof may be, for example, 9,000 to 200,000, and preferably 20,000 to 150,000. Additionally, a gel portion (THF insoluble matter) thereof may be, for example, 10 mass % or less, and preferably 0.5 to 10 mass %. Moreover, a glass transition point (Tg) thereof may be, for example, 50 to 70° C., and preferably 55 to 65° C. Specific examples of commercially available polyester resins include FC1565 (manufactured by Mitsubishi Rayon), FC023 (manufactured by Mitsubishi Rayon), and the like. As described above, if the water-soluble organic solvent is not liquid at the melting point of the resin powder, the water-based ink will not readily mix with and the resin powder. On the other hand, if the water-soluble organic solvent is liquid at the melting point of the resin powder, a binder resin in the resin powder will enter into the water-based ink and increase a volume of resin in the water-based ink. This enhances the fixability and abrasion resistance of the water-based ink. Accordingly, if the resin powder contains a binder resin, it is preferable that the binder resin be molten at a temperature at which the water-soluble organic solvent is liquid.

Examples of the release agent include polyolefin wax, long-chain hydrocarbon wax, and ester wax.

The charge control agent may be selected from known positively charged charge control agents, and may be used alone or in combination depending on the purpose and application. For example, if the charge control agent is a charge control resin made from synthetic resin, the agent can be well fixed to the binder resin. Additionally, if the charge control resin is a synthetic resin with a cationic group, a positive charge can be stably applied to the resin powder.

Examples of the cationic group include quaternary ammonium groups, quaternary ammonium salt-containing groups, amino groups, phosphonium salt-containing groups, and the like. Of the cationic groups, quaternary ammonium salt-containing groups are preferable. Any cationic group that is a quaternary ammonium salt-containing group can stably emulsify the charge control resin and enhance a stability of an electrification of an obtained toner.

A lower limit of the amount of the resin powder applied is, for example, 0.1 mg/cm2 or more. An upper limit of the amount of the resin powder applied is, for example, 4.0 mg/cm2 or less, preferably 3.0 mg/cm2 or less, and more preferably 2.5 mg/cm2 or less. The present inventors have found that a sufficient OD value cannot be obtained when the amount of the resin powder applied is less than 0.1 mg/cm2. Furthermore, from the viewpoint of reducing amounts consumed, the smaller the amount of the resin powder applied, the better. For these reasons, it is preferable that the amount of the resin powder applied be 0.1 mg/cm2 or more.

A lower limit of the amount of the water-based ink applied is, for example, 0.004 mg/cm2 or more, 0.04 mg/cm2 or more, or 0.4 mg/cm2 or more. An upper limit of the amount of the water-based ink applied is, for example, 24 mg/cm2 or less, 12 mg/cm2 or less, 8 mg/cm2 or less, or 4 mg/cm2 or less.

A ratio (X/Y) of the amount (X) of the resin powder applied and the amount (Y) of the water-based ink applied is, for example, 0.04 to 240, preferably 0.4 to 80, and more preferably 40 to 80.

With respect to the resin powder and the pigment; one may be cationic and the other may be anionic. For example, the resin powder may be cationic and the pigment anionic, or the resin powder may be anionic and the pigment cationic. From the perspective of ink bleeding, it is preferable that the resin powder be cationic and the pigment be anionic.

A contact angle of the water-based ink with respect to the resin powder is, for example, 50 degrees or more, preferably 55 degrees or more, and more preferably 60 degrees or more.

The contact angle can be measured using, for example, a method like that described below.

(Contact Angle Evaluation)

The contact angle was measured using a contact angle meter (product name: "Drop Master 701SA") manufactured by Kyowa Interface Science Co., Ltd.

Examples of the object to be subjected to image forming include recording media such as fabric, paper, or the like.

The fabric may include both knitted and woven fabrics. Examples of the material of the fabric include natural fibers and synthetic fibers. Examples of the natural fibers include cotton, silk, and the like. The material of the fabric may be, for example, a blend spun by mixing a plurality of types of the natural fibers, or a blend spun by mixing the natural fibers and the synthetic fibers. Examples of the synthetic fibers include polyester, acrylic, rayon, urethane, nylon, and the like. Examples of a blend of the natural fibers and the synthetic fibers include a 50%/50% blend of cotton and polyester, and the like.

Examples of the recording medium include plain paper, glossy paper, matte paper, coated paper, synthetic paper, paperboard, cardboard, film, and the like.

The resin powder applying step may be performed manually or by an electrophotographic method. When performed manually, the resin powder can be applied to the object to be subjected to image forming using, for example, hands or instruments such as spoons, brushes, powder sieves, and the like. When performed using an electrophotographic method, the resin powder can be applied to the object to be subjected to image forming using, for example, a conventionally known laser printer. Specifically, by passing the object to be subjected to image forming between a photoreceptor drum and a transfer roll of the later printer, the resin powder is applied from the photoreceptor drum to the object to be subjected to image forming.

The image forming step can be implemented using, for example, the inkjet recording device illustrated in the FIGURE.

A configuration of an example of the inkjet recording device is illustrated in the FIGURE. As illustrated in the FIGURE, this inkjet recording device 1 includes an ink cartridge 2, ink applying means (inkjet head) 3, a head unit 4, a carriage 5, a drive unit 6, a platen roller 7, and a purge device 8 as major constituent elements. Furthermore, although not illustrated in the FIGURE, the ink cartridge 2 and the ink applying means 3 are connected by an ink flow path. The water-based ink is supplied to the ink flow path from the ink cartridge 2 in which the water-based ink is stored and the ink applying means 3 applies the water-based ink to the object to be subjected to image forming P.

The ink cartridge 2 may contain, for example, the water-based ink. A conventionally known unit may be used as a main unit of the ink cartridge.

Additionally, although not illustrated in the FIGURE, the inkjet recording device 1 includes, in addition to the ink cartridge 2 containing the water-based ink, a set of four ink cartridges, each containing one of four colors of water-based ink; yellow, magenta, cyan, and black. An integrated ink cartridge, an interior of which is partitioned so as to form a water-based yellow ink storage reservoir, a water-based magenta ink storage reservoir, a water-based cyan ink storage reservoir, and a water-based black ink storage reservoir, may be used in place of the set of four ink cartridges.

The inkjet head 3, which is installed in the head unit 4, performs image forming on the object to be subjected to image forming P. The ink cartridge 2 and the head unit 4 are mounted on the carriage 5. The drive unit 6 moves the carriage 5 reciprocally in a linear direction. A conventionally known unit (see Japanese Unexamined Patent Application Publication No. 2008-246821 (corresponding to US 2008/241398); the contents of these documents are incorporated herein by reference in their entireties)) may be used as the drive unit 6. The platen roller 7 is arranged extending in a reciprocating direction of the carriage 5, and facing the inkjet head 3.

The purge device 8 sucks up defective ink containing air bubbles, and the like, that accumulates inside the inkjet head 3. A conventionally known device (see Japanese Unexamined Patent Application Publication No. 2008-246821) may be used as the purge device 8.

A wiper member 20 is arranged on the platen roller 7 side of the purge device 8, adjacent to the purge device 8. The wiper member 20 is formed in the shape of a spatula, and wipes a nozzle forming surface of the inkjet head 3 in conjunction with a movement of the carriage 5. In the FIGURE, a cap 18 covers a plurality of nozzles on the inkjet head 3, which is returned to a set position when recording finishes to prevent ink from drying.

In the inkjet recording device 1 according to this example, the ink cartridge 2 is mounted, together with the head unit 4, in one carriage 5. However, the present invention is not limited to this. In the inkjet recording device 1, the ink cartridge 2 may be mounted on a different carriage than the head unit 4. Furthermore, the ink cartridge 2 may be arranged and fixed inside the inkjet recording device 1, and not mounted on the carriage 5. In these embodiments, for example, the ink cartridge 2 and the head unit 4 mounted on the carriage 5 are connected by the ink flow path, which is a tube, or the like, and the ink is supplied to the head unit 4 from the cartridge 2. Furthermore, in these embodiments, a bottle shaped ink bottle may be used instead of the ink cartridge 2. In this case, it is preferable that an injection port for injecting ink from outside into an interior be provided in the ink bottle.

The image forming step using this inkjet recording device 1 is, for example, implemented as follows. First the object to be subjected to image forming P is supplied from a side of, or below, the inkjet recording device 1. The object to be subjected to image forming P is introduced between the inkjet head 3 and the platen roller 7. A specified image is formed of water-based ink applied from the inkjet head 3 to an area of the introduced object to be subjected to image forming P to which the resin powder has been applied. The object to be subjected to image forming P is ejected from the inkjet recording device 1 after the image forming. Mechanisms for supplying and ejecting the object to be subjected to image forming P have been omitted in the FIGURE and are thus not illustrated.

Although the device illustrated in the FIGURE uses a serial-type inkjet head, the present invention is not limited to this and thus, for example, the device may be one that uses a line-type inkjet head or a roll-to-roll. Note that the serial-type inkjet head is an inkjet head that prints while reciprocating the inkjet head in a width direction of an image forming object. A line-type inkjet head is an inkjet head that covers an entire width of the image forming object. Roll-to-roll is a method in which a roll-shaped image forming object is fed out, printed, and then wound back up into a roll shape.

Although not illustrated in the FIGURE, the inkjet recording device 1 in the FIGURE also includes a heat treating unit. The heat treating unit may include, inside thereof, a contact heating member or a non-contact heating member. Examples of the contact heating member include heat rollers, hot plates, and the like. Examples of the non-contact heating member include ovens, belt conveyor ovens, dryers, and the like. The heat treating unit may be provided independent of the inkjet recording device 1.

Thermal fixing in the thermal fixing step may be performed, for example, through contact with, or non-contact with, the object to be subjected to image forming. Examples of the contact method include methods that use heat rollers, commercially available hot presses, and the like. Examples of the non-contact method include methods that use ovens, belt conveyor ovens, dryers, and the like. A temperature of the contact heating member and the non-contact heating member used in the thermal fixing is 100° C. to 200° C., and preferably 150° C. to 200° C. If the object to be subjected to image forming is cotton, the object will burn at temperatures exceeding 235° C., which is the decomposition temperature of cotton. Accordingly, it is preferable that the temperature in the thermal fixing be 200° C. or less, and thus not exceed the heat resistance temperature of cotton. Furthermore, with respect to drying properties, although the water-based ink will dry quickly if the temperature is 100° C. or more, for quicker drying while preventing damage to the cotton, it is preferable that the temperature in the thermal fixing be, for example, 150° C. or more.

The image forming method according to the present disclosure may, for example, after the resin powder applying step, perform the image forming step, while maintaining a resin powder state applied in the resin powder applying step, and then perform the thermal fixing step. By performing image forming by this method, image quality (OD) is more enhanced than when the thermal fixing step is performed after the resin powder applying step, as is describe later.

Furthermore, the image forming method according to the present disclosure may, for example, after the resin powder applying step, perform the thermal fixing step, then the image forming step, and then, after that, the thermal fixing step again.

If the thermal fixing step is performed after the resin powder applying step, the laser printer may include a heat treating unit. The heat treating unit included in the laser printer is, for example, the same as the heat treating unit in the inkjet recording device 1 described in the example. Furthermore, the heat treating unit may be provided independent of the laser printer.

A method for manufacturing the image formation according to the present disclosure is described next. The method for manufacturing the image formation according to the present disclosure includes the image forming step, and the image forming step is implemented by the image forming method according to the present disclosure.

An image forming system according to the present disclosure is described next. The image forming system according to the present disclosure includes an ink flow path, a resin powder housing section, ink applying means, and resin powder applying means, uses the resin powder applying means to apply resin powder housed in the resin powder housing section to an object to be subjected to image forming, uses the ink applying means to apply water-based ink supplied into the ink flow path to the object to be subjected to image forming so that the ink overlaps an area to which the resin powder was applied, and then supplies the water-based ink described in the above embodiment into the ink flow path.

The image forming system according to the present disclosure may be a combination of the inkjet recording device 1 in the FIGURE and a conventionally known laser printer like that disclosed in the above embodiment. The image forming system according to the present disclosure may be provided integrated with, or independent of, the inkjet recording device 1 and the laser printer.

Examples according to the present disclosure are described next along with comparative examples. Note the present disclosure is neither limited nor restricted by the examples and comparative examples described below. Also, in the following description, "part" and "%" are based on mass unless otherwise specified. Furthermore, various types of physical properties were measured according to measurement methods described later.

(Water-Based Ink) 1. Preparation of Pigment Dispersion
<Self-Dispersing Bk>

40 g of carbon black "#2650" manufactured by Mitsubishi Chemical Co., Ltd. was mixed with 200 g of deionized water and then pulverized in a bead mill. A carboxyl group agent was added to this, and the mixture was oxidized by heating and stirring. Then, the resulting liquid was washed several times with a solvent, poured into water, rewashed repeatedly in water, filtered with a filter, and the self-dispersing Bk pigment shown in Table 1 was obtained. The average particle size of the carbon black contained in this self-dispersing Bk pigment, as measured using an "LB-550" manufactured by Horiba, Ltd. was 135 nm.

<Resin Dispersion Bk>

A mixture was obtained by adding pure water to 20 wt % of a pigment (carbon black) and 7 wt % (acid value: 175 mg KOH/g, molecular weight: 10000) of a styrene-acrylic acid copolymer neutralized with sodium hydroxide, for a total of 100 wt %, and then stirring and mixing. This mixture was put in a wet sand mill filled with 0.3 mm diameter zirconia beads, and dispersed for 6 hours. Then, the zirconia beads were removed using a separator, and the resin dispersion Bk shown in Table 1 was obtained by filtering with an acetate filter with a pore size of 3.0 μm. Note that styrene-acrylic acid copolymers are water soluble polymers commonly used as dispersions for pigments.

<Resin Dispersion M>

A mixture was obtained by adding pure water to 20 mass % of a pigment (C.I. pigment red 122) and 7 mass % (acid value: 50 mg KOH/g, molecular weight: 10000) of a styrene-acrylic acid copolymer neutralized with sodium hydroxide, for a total of 100 wt %, and then stirring and mixing. This mixture was put in a wet sand mill filled with 0.3 mm diameter zirconia beads, and dispersed for 6 hours. Then, the zirconia beads were removed using a separator, and the resin dispersion M shown in Table 1 was obtained by filtering with an acetate filter with a pore size of 3.0 μm. Note that styrene-acrylic acid copolymers are water soluble polymers commonly used as dispersing agents for pigments.

2. Fixing Resin <Urethane Resin>

A substance synthesized by causing glycols and polyisocyanates to react was used. The average particle size of this fixing resin, as measured using a dynamic light scattering particle size distribution analyzer ("LB-550" manufactured by Horiba, Ltd.) was 40 nm.

<Acrylic Resin>

44.7 wt % of Mowinyl 6899D (manufactured by Japan Coating Resin Co., Ltd.) was used.

<Polyester Resin>

30 wt % of elitel KT-8803 (manufactured by UNITIKA, Ltd.) was used.

3. Preparation of Water-Based Ink

An ink solvent was obtained by uniformly mixing ingredients excluding a pigment in the water-based ink composition in Tables 1 and 2. Next, pigment was added to the ink solvent and mixed uniformly. Then, the water-based ink of Examples 1 through 13 shown in Table 1 and Comparative Examples 1 through 8 shown in Table 2 was obtained by filtering the resulting mixture with a cellulose acetate type membrane filter (pore size: 3.00 μm) manufactured by Toyo Roshi Kaisha, Ltd.

(Resin Powder) 1. Step for Preparing a Charge Control Resin Fine Particle Suspension A charge control resin liquid was obtained by mixing and stirring 82.5 parts of MEK (methyl ethyl ketone) and 17.5 parts of a charge control resin (product name: "FCA-201PS" manufactured by Fujikura Kasei Co., Ltd.) to dissolve the charge control resin in the MEK. A charge control resin emulsion was obtained by mixing 100 parts of distilled water with 100 parts of this charge control resin liquid and then stirring for 20 minutes at a rotation speed of 16000 rpm (tip peripheral speed: 10.5 m/s) using a homogenizer (rotor stator-type, shaft 18F, rotor diameter 12.5 mm: model DIAX-900 manufactured by Heidolph). A charge control resin fine particle suspension with charge control resin fine particles dispersed therein was obtained by transferring the charge control resin emulsion to a 1 L separable flask, heating and stirring at 60° C. for 120 minutes while blowing nitrogen into the gas phase to volatilize and remove MEK. The solid content concentration of the charge control resin fine particle suspension was 22.9%. Furthermore, the volume average particle size (median diameter: D50) of the charge control resin fine particles in the charge control resin fine particle suspension was 110 nm.

2. Resin Powder Parent Particle Manufacturing Step (1) Parent Fine Particle Suspension (1-1) Preparation of Binder Resin Liquid A binder resin liquid was obtained by mixing 180 parts of a polyester resin (FC1565: Tg 62° C., Mn (number average molecular weight): 3600, Mw (weight average molecular weight): 50000, gel portion: less than 2 wt %, acid value: 6.0 KOH mg/g manufactured by Mitsubishi Rayon) with 720 parts of MEK, stirring, and then heating and stirring to a liquid temperature of (1-2) Preparation of Binder Resin Emulsion A binder resin emulsion was obtained by mixing 900 parts of the obtained binder resin liquid, 900 parts of distilled water, and 9.0 parts of 1N aqueous sodium hydroxide solution, and then stirring and emulsifying for 20 minutes at a rotation speed of 15000 rpm (tip peripheral speed: 13.0 m/s) using a homogenizer (shaft 22F, rotor diameter: 16.5 mm).

(1-3) Preparation of Parent Fine Particle Suspension

A parent fine particle suspension with parent fine particles dispersed therein was obtained by transferring the emulsion to a 2 L separable flask, heating and stirring at 75° C. for 140 minutes while blowing nitrogen into the gas phase to remove MEK. The solid content of the parent fine particle suspension was 23.1 mass %. Furthermore, the volume average particle size (median diameter: D50) of the parent fine particles in the parent fine particle suspension was 299 nm. Additionally, the glass transition point (Tg) of the parent fine particles in the parent fine particle suspension was 58.3° C.

(2) Resin Powder Parent Particle Suspension

Next, 1600 parts of a diluted parent fine particle suspension with a solid content concentration of 10% was prepared by mixing 57.6 parts of a 5% aqueous solution of nonionic surfactant (EPAN 785: polyoxyethylene polyoxypropylene block copolymer manufactured by DKS Co., Ltd.) with 692.6 parts of parent fine particle suspension, and then diluting with 849.8 parts of distilled water. 35 parts of 0.2N aluminum chloride aqueous solution were added to this diluted solution as a flocculant, then mixed at high speed for 10 minutes at a rotation speed of 8000 rpm using a homogenizer (shaft 22F, roller diameter: 16.5 mm). Then, parent fine particles were aggregated by heating the diluted solution to 45° C. while stirring at a rotation speed of 300 rpm with 6 flat turbine blades (φ75 mm). Then, a resin powder parent particle suspension was obtained by adding 46 parts of 0.2N sodium hydroxide solution as an aggregation terminator, heating to 90° C., and then stirring for approximately 6.5 hours. After filtering the obtained resin powder parent particle suspension, the filtered resin powder parent particles were washed with distilled water and put into a separable flask. 1600 parts of a resin powder parent particle suspension with a solid content of 10 mass % (160 parts as resin powder parent particles) were obtained by pouring distilled water into the particles to once again disperse the resin powder parent particles. The volume-based average particle size (Dv) of the resin powder parent particles was 8.1 μm.

3. Resin Powder Creation Step (1) Applying Charge to Resin Powder Parent Particles A mixture was prepared by mixing 7 parts of a charge control resin fine particle suspension with charge control resin fine particles dispersed therein (solid content: 22.9 mass %) (1.6 parts as charge control fine particles) with the 1600 parts of a resin powder parent particle suspension with a solid content of 10 mass % (160 parts as resin powder parent particles) in a 25° C. water bath and stirring for 15 minutes at 200 rpm using an impeller (6-plate turbine two-stage blades: diameter 75 mm). Then, the mixture was filtered and a cake was washed with distilled water and filtered; this was repeated until the conductivity of the resulting filtrate became 4 μS/cm or less.

(2) External Addition Processing

Then, 1 part of HVK2150H (hydrophobic silica manufactured by Clariant AG) and 1 part of NA50H (hydrophobic silica manufactured by Aerosil Co., Ltd.) were blended with 100 parts of adequately charged resin powder parent particles, and then stirred for 3 minutes at a rotation speed of 2500 rpm with a MECHANOMILL (manufactured by Okada Seiko Co., Ltd.). Then, a resin powder was obtained by removing course aggregates of hydrophobic silica with a sieve.

Composition (one example) Binder resin: 80 to 90 wt % Release agent: 3 to 10 wt % Charge control agent: 0 to 5 wt % External additive: 1 to 2 wt %

Examples 1 Through 13 and Comparative Examples 1 Through 8

The fabric of Examples 1 through 13 shown in Table 1 and of Comparative Examples 1 through 8 shown in Table 2 was obtained by performing the image forming described below.

(Image Forming)

First, the resin powder prepared in "2. Resin powder parent particle manufacturing step" and "3. Resin powder creation step" described above was spread out on an appropriate resin film. Note that the amounts of the resin powder applied are the amounts shown in Tables 1 and 2 below. A fabric was covered with the resin film, and then the resin powder was transferred (applied) to the fabric by peeling off the film. Cotton ("MC1082" manufactured by COTTON HERITAGE Co., Ltd.) was used as the fabric. The water-based ink shown in Tables 1 and 2 below was applied (amount applied: 4.0 mg/cm2) to an area to which the resin powder had been applied. Then, the resin powder and the water-based ink were thermally fixed to the fabric by pressing and fixing with a heat press at 180° C. In Example 12, the thermal fixing temperature was 110° C. In Example 13, pressing and fixing with a heat press at 180° C. was performed after the resin powder was transferred to the fabric, then the water-based ink was applied, and then thermal fixing was performed. The conditions in Comparative Example 1 were the same as those in Example 1, except that polyvalent metal salt containing calcium was used in place of resin powder. The conditions in Comparative Examples 2 and 4 through 8 were the same as those in Examples 1 and 8 through 11, except that resin powder was not used. The conditions in Comparative Example 3 were the same as those in Example 5, except that anionic resin powder was used.

Evaluations of (a) pretreating traces, (b) bleeding, (c) image quality (OD value), and (d) abrasion resistance were performed with respect to the fabric of Examples 1 through 13 and Comparative Examples 1 through 8.

(a) Pretreating Trace Evaluation

A recorded portion to which resin powder had been applied was visually evaluated according to the following evaluation criteria.

Pretreating trace evaluation Evaluation criteria A: Absent, C: Present (b) Bleeding Evaluation Solid printing was performed by ejecting water-based ink using an inkjet method.

Visual evaluation was performed according to the following evaluation criteria.

Bleeding evaluation Evaluation criteria A: Absent, C: Present (c) Image Quality (OD Value) Evaluation Average value was found by measuring with an XRite-939 spectrophotometer (light source: D65, field of view angle: 10°, ANSI-T) manufactured by X-Rite Co., Ltd. When self-dispersion Bk, resin dispersion Bk, and resin dispersion M were used, evaluation was performed according to the following evaluation criteria.

Image quality (OD value) evaluation Evaluation criteria—Self-dispersion Bk AA: 1.41 or more, A: 1.36 or more and less than 1.41, B: less than 1.36—Resin dispersion Bk A: 1.40 or more, B: less than 1.40—Resin dispersion M A: 1.33 or more, B: less than 1.33

(d) Abrasion Resistance Evaluation

Color migration (OD value) to a white test cloth was evaluated according to the following evaluation criteria by setting the white test cloth in the probe of an "RT-200" JSPS-type friction tester manufactured by Daiei Kagaku Seiki Mfg. Co., Ltd., and rubbing an image forming (ink film) portion thereupon.

Abrasion resistance evaluation Evaluation criteria AA: less than 0.13, A: 0.13 or more and less than 0.20, B: 0.20 or more and less than 0.35, C: 0.35 or more Evaluation results for Examples 1 through 13 and Comparative Examples 1 through 8 are shown in Tables 1 and 2, respectively.

TABLE 1

| | Composition | | Example 1 | Example 2 | Example 3 | Example 4 | Example 5 | Example 6 | Example 7 |
|---|---|---|---|---|---|---|---|---|---|
| Water-based ink (solid content) | Pigment | Self-dispersing Bk pigment | 3.0 | 3.0 | 3.0 | 3.0 | 3.0 | 3.0 | 3.0 |
| | | Resin dispersion Bk pigment | | | | | | | |
| | | Resin dispersion M pigment | | | | | | | |
| | Fixing resin | Urethane resin (*1) | 7.0 | 7.0 | 7.0 | 7.0 | 7.0 | 7.0 | 7.0 |
| | | Acrylic resin (*2) | | | | | | | |
| | | Polyester resin (*3) | | | | | | | |
| | Wetting agent | Glycerin (b.p. 290° C.) | 15.0 | 15.0 | 15.0 | 15.0 | 15.0 | 10.0 | 10.0 |
| | Surfactant | OLFINE ® E1010 (nonionic) (*4) | 0.5 | 0.5 | | 0.5 | 0.5 | 0.5 | 0.5 |
| | | Anionic surfactant (*5) | | | 0.5 | | | | |
| | Penetrant | TEG (b.p. 278° C.) (*6) | | | | | | 5.0 | |
| | | 1,2-HDL (b.p. 118° C.) (*7) | | | | | | | 5.0 |
| | | Water | Remainder | Remainder | Remainder | Remainder | Remainder | Remainder | Remainder |
| Contact angle (degrees) of water-based ink on resin powder | | | 64 | 64 | 88 | 73 | 64 | 61 | 43 |
| Image forming method | Pretreatment coating material | | Powder | Powder | Powder | Powder | Powder | Powder | Powder |
| | Resin powder charge | | Cationic | Cationic | Cationic | Cationic | Cationic | Cationic | Cationic |
| | Pretreatment applied amount (mg/cm$^2$) | | 2.0 | 1.2 | 0.4 | 0.4 | 0.4 | 0.4 | 0.4 |
| | Water-based ink applied amount (mg/cm$^2$) | | 4.0 | 4.0 | 4.0 | 4.0 | 4.0 | 4.0 | 4.0 |
| | Fixing means (presence or absence of drying after resin powder application) | | Absent | Absent | Absent | Absent | Absent | Absent | Absent |
| | Thermal fixing temperature (° C.) | | 180 | 180 | 180 | 180 | 180 | 180 | 180 |
| Evaluation item | Pretreating traces | A: Absent C: Present | A | A | A | A | A | A | A |
| | Bleeding | A: Absent C: Present | A | A | A | A | A | A | A |
| | Image quality (OD) | Self-dispersing Bk / Resin dispersion Bk / Resin dispersion M — AA: 1.41 or more / A: 1.40 or more / A: 1.33 or more; A: 1:36 or more and less than 1.41 / B: less than 1.40 / B: less than 1.33; B: less than 1.36 | AA 1.47 | AA 1.44 | AA 1.46 | AA 1.44 | A 1.38 | A 1.36 | B 1.33 |
| | Abrasion resistance | Abraded cloth OD value is AA: less than 0.13; A: 0.13 or more and less than 0.20; B: 0.20 or more and less than 0.35; C: 0.35 or more | AA 0.12 | AA 0.12 | A 0.13 | A 0.14 | A 0.18 | A 0.15 | A 0.15 |

| | Composition | | Example 8 | Example 9 | Example 10 | Example 11 | Example 12 | Example 13 |
|---|---|---|---|---|---|---|---|---|
| Water-based ink (solid content) | Pigment | Self-dispersing Bk pigment | | | 3.0 | 3.0 | 3.0 | 3.0 |
| | | Resin dispersion Bk pigment | 3.0 | | | | | |
| | | Resin dispersion M pigment | | 3.0 | | | | |
| | Fixing resin | Urethane resin (*1) | 7.0 | 7.0 | | | 7.0 | 7.0 |
| | | Acrylic resin (*2) | | | 7.0 | | | |
| | | Polyester resin (*3) | | | | 7.0 | | |
| | Wetting agent | Glycerin (b.p. 290° C.) | 15.0 | 15.0 | 15.0 | 15.0 | 15.0 | 15.0 |
| | Surfactant | OLFINE ® E1010 (nonionic) (*4) | 0.5 | 0.5 | 0.5 | 0.5 | 0.5 | 0.5 |
| | | Anionic surfactant (*5) | | | | | | |
| | Penetrant | TEG (b.p. 278° C.) (*6) | | | | | | |
| | | 1,2-HDL (b.p. 118° C.) (*7) | | | | | | |
| | | Water | Remainder | Remainder | Remainder | Remainder | Remainder | Remainder |
| Contact angle (degrees) of water-based ink on resin powder | | | 45 | 75 | 47 | 69 | 64 | 64 |
| Image forming method | Pretreatment coating material | | Powder | Powder | Powder | Powder | Powder | Powder |
| | Resin powder charge | | Cationic | Cationic | Cationic | Cationic | Cationic | Cationic |
| | Pretreatment applied amount (mg/cm$^2$) | | 0.4 | 0.4 | 0.4 | 0.4 | 0.4 | 0.4 |
| | Water-based ink applied amount (mg/cm$^2$) | | 4.0 | 4.0 | 4.0 | 4.0 | 4.0 | 4.0 |
| | Fixing means (presence or absence of drying after resin powder application) | | Absent | Absent | Absent | Absent | Absent | Present |
| | Thermal fixing temperature (° C.) | | 180 | 180 | 180 | 180 | 110 | 180 |
| Evaluation item | Pretreating traces | A: Absent C: Present | A | A | A | A | A | A |
| | Bleeding | A: Absent C: Present | A | A | A | A | A | A |

TABLE 1-continued

| | | | | | | | | | |
|---|---|---|---|---|---|---|---|---|---|
| Image quality (OD) | Self-dispersing Bk | Resin dispersion Bk | Resin dispersion M | A | A | AA | AA | B | B |
| | AA: 1.41 or more A: 1:36 or more and less than 1.41 B: less than 1.36 | A: 1.40 or more B: less than 1.40 | A: 1.33 or more B: less than 1.33 | 1.42 | 1.34 | 1.45 | 1.47 | 1.33 | 1.3 |
| Abrasion resistance | Abraded cloth OD value is AA: less than 0.13 A: 0.13 or more and less than 0.20 B: 0.20 or more and less than 0.35 C: 0.35 or more | | | A 0.14 | AA 0.12 | B 0.3 | B 0.24 | A 0.14 | A 0.14 |

(*1): Reactant of glycols and polyisocyanates
(*2): Mowinyl 6899D: manufactured by Japan Coating Resin Co., Ltd.
(*3): elitel KT-8803: manufactured by UNITIKA, Ltd.
(*4): Nonionic surfactant (acetylene glycol surfactant): manufactured by Nissin Chemical Co., Ltd.
(*5): Anionic surfactant: manufactured by Lion Co., Ltd.
(*6): Triethylene glycol
(*7): 1,2-hexanediol

TABLE 2

| | Composition | | Comparative Example 1 | Comparative Example 2 | Comparative Example 3 | Comparative Example 4 |
|---|---|---|---|---|---|---|
| Water-based ink (solid content) | Pigment | Self-dispersing Bk pigment | 3.0 | 3.0 | 3.0 | |
| | | Resin dispersion Bk pigment | | | | 3.0 |
| | | Resin dispersion M pigment | | | | |
| | Fixing resin | Urethane resin (*1) | 7.0 | 7.0 | 7.0 | 7.0 |
| | | Acrylic resin (*2) | | | | |
| | | Polyester resin (*3) | | | | |
| | Wetting agent | Glycerin (b.p. 290° C.) | 15.0 | 15.0 | 15.0 | 15.0 |
| | Surfactant | OLFINE ® E1010 (nonionic) (*4) | 0.5 | 0.5 | 0.5 | 0.5 |
| | | Anionic surfactant (*5) | | | | |
| | Penetrant | TEG (b.p. 278° C.) (*6) | | | | |
| | | 1,2-HDL (b.p. 118° C.) (*7) | | | | |
| | | Water | Remainder | Remainder | Remainder | Remainder |
| Contact angle (degrees) of water-based ink on resin powder | | | 64 | 64 | 64 | 45 |
| Image forming method | Pretreatment coating material | | Polyvalent metal salt (Ca) | None | Powder | None |
| | Resin powder charge | | — | — | Anionic | — |
| | Pretreatment applied amount (mg/cm²) | | 13.8 | — | 0.4 | — |
| | Water-based ink applied amount (mg/cm²) | | 4.0 | 4.0 | 4.0 | 4.0 |
| | Fixing means (presence or absence of drying after resin powder application) | | — | — | Absent | — |
| | Thermal fixing temperature (° C.) | | 180 | 180 | 180 | 180 |
| Evaluation item | Pretreating traces | A: Absent C: Present | C | A | A | A |
| | Bleeding | A: Absent C: Present | A | C | C | C |
| | Image quality (OD) | Self-dispersing Bk / Resin dispersion Bk / Resin dispersion M — AA: 1.41 or more A: 1:36 or more and less than 1.41 B: less than 1.36 / A: 1.40 or more B: less than 1.40 / A: 1.33 or more B: less than 1.33 | AA 1.50 | A 1.36 | A 1.38 | B 1.36 |
| | Abrasion resistance | Abraded cloth OD value is AA: less than 0.13 A: 0.13 or more and less than 0.20 B: 0.20 or more and less than 0.35 C: 0.35 or more | A 0.16 | B 0.27 | A 0.16 | B 0.28 |

TABLE 2-continued

| Composition | | | Comparative Example 5 | Comparative Example 6 | Comparative Example 7 | Comparative Example 8 |
|---|---|---|---|---|---|---|
| Water-based ink (solid content) | Pigment | Self-dispersing Bk pigment | | 3.0 | 3.0 | 3.0 |
| | | Resin dispersion Bk pigment | | | | |
| | | Resin dispersion M pigment | 3.0 | | | |
| | Fixing resin | Urethane resin (*1) | 7.0 | | | 7.0 |
| | | Acrylic resin (*2) | | 7.0 | | |
| | | Polyester resin (*3) | | | 7.0 | |
| | Wetting agent | Glycerin (b.p. 290° C.) | 15.0 | 15.0 | 15.0 | |
| | Surfactant | OLFINE ® E1010 (nonionic) (*4) | 0.5 | 0.5 | 0.5 | 0.5 |
| | | Anionic surfactant (*5) | | | | |
| | Penetrant | TEG (b.p. 278° C.) (*6) | | | | 15.0 |
| | | 1,2-HDL (b.p. 118° C.) (*7) | | | | |
| | Water | | Remainder | Remainder | Remainder | Remainder |
| Contact angle (degrees) of water-based ink on resin powder | | | 75 | 47 | 69 | 69 |
| Image forming method | Pretreatment coating material | | None | None | None | None |
| | Resin powder charge | | — | — | — | — |
| | Pretreatment applied amount (mg/cm$^2$) | | — | — | — | — |
| | Water-based ink applied amount (mg/cm$^2$) | | 4.0 | 4.0 | 4.0 | 4.0 |
| | Fixing means (presence or absence of drying after resin powder application) | | — | — | — | — |
| | Thermal fixing temperature (° C.) | | 180 | 180 | 180 | 180 |
| Evaluation item | Pretreating traces | A: Absent C: Present | A | A | A | A |
| | Bleeding | A: Absent C: Present | C | C | C | C |
| | Image quality (OD) | Self-dispersing Bk / Resin dispersion Bk / Resin dispersion M — AA: 1.41 or more / A: 1.40 or more / A: 1.33 or more; A: 1.36 or more and less than 1.41 / B: less than 1.40 / B: less than 1.33; B: less than 1.36 | B / 1.31 | AA / 1.42 | AA / 1.42 | B / 1.35 |
| | Abrasion resistance | Abraded cloth OD value is AA: less than 0.13 A: 0.13 or more and less than 0.20 B: 0.20 or more and less than 0.35 C: 0.35 or more | B / 0.21 | C / 0.60 | C / 0.54 | C / 0.35 |

(*1): Reactant of glycols and polyisocyanates
(*2): Mowinyl 6899D: manufactured by Japan Coating Resin Co., Ltd.
(*3): elitel KT-880: manufactured by UNITIKA, Ltd.
(*4): Nonionic surfactant (acetylene glycol surfactant): manufactured by Nissin Chemical Co., Ltd.
(*5): Anionic surfactant: manufactured by Lion Co., Ltd.
(*6): Triethylene glycol
(*7): 1,2-hexanediol As is shown in Table 1, Examples 1 to 13 scored well in both the pretreating trace evaluation and the bleeding evaluation. Furthermore, Examples 1 to 6 and 8 to 11 where fixing temperature was 150 to 200° C., which contained a water-soluble organic solvent with a boiling point of 200° C. or more, did not contain a water-soluble organic solvent with a boiling point of less than 200° C., and did not undergo thermal fixing after resin powder application, also scored well, in addition to the pretreating trace evaluation and the bleeding evaluation, in the image quality evaluation, scoring at least "A." Additionally, Examples 1 to 9, 12, and 13, for which urethane resin was used as a fixing resin, also scored well, in addition to the pretreating trace evaluation and the bleeding evaluation, in the abrasion resistance evaluation, scoring at least "A."

As is shown in Table 2, Comparative Examples 1 through 8 scored poorly in both the pretreating trace evaluation and the bleeding evaluation. Specifically, Comparative Example 1, for which polyvalent metal salts were used as a pretreating agent, scored poorly in the pretreating trace evaluation. Comparative Examples 2 and 4 through 8, which did not undergo pretreatment using resin powder, all scored poorly in the evaluations. Comparative Example 3, for which an anionic resin powder was used, also scored poorly in the evaluations.

Some or all of the above embodiments and examples can be described as in the following appendices, but are not limited thereto. (Appendix 1) An image forming method that includes a resin powder applying step that applies a resin powder to an object to be subjected to image forming; an image forming step that uses an inkjet method to apply a water-based ink to an area in which the resin powder was applied (a first area); and a thermal fixing step that applies heat to the area in which the resin powder was applied and the area in which the water-based ink was applied (a second area) to fix the resin powder and the water-based ink to the object, wherein the water-based ink contains a pigment and is either thickened, or the pigment in the water-based ink is aggregated, by contact with the resin powder. (Appendix 2) The image forming method according to Appendix 1, wherein the water-based ink contains a water-soluble organic solvent, and the water-soluble organic solvent is liquid at the melting point of the resin powder. (Appendix 3) The image forming method according to Appendix 2, wherein the water-based ink contains a water-soluble organic solvent, and the water-soluble organic solvent has a boiling point of 200° C. or more. (Appendix 4) The image forming method according to any one of Appendices 1 through 3, wherein either the resin powder or the pigment is cationic, and the other is anionic. (Appendix 5) The image forming method according to Appendix 4, wherein the resin powder is cationic, and the pigment is an anionic pigment. (Appendix 6) The image forming method according to any of Appendices 1 through 5, wherein the water-based ink contains a surfactant, and the surfactant is anionic. (Appendix 7) The image forming method according to any one of Appendices 1 through 6, wherein the water-based ink has a contact angle with respect to the resin powder of 50 degrees or more. (Appendix 8) The image forming method according to any one of Appendices 1 through 7, wherein the water-based ink contains a fixing resin, and a solid content of the fixing resin in a total amount of the water-based ink is 5 mass % or more. (Appendix 9) The image forming method according to any one of Appendices 1 through 8, wherein a temperature of a heating member in the thermal fixing step is 150 to 200° C. (Appendix 10) The image forming method according to any one of Appendices 1 through 9, wherein an applied amount of the resin powder is 0.1 mg/cm2 or more. (Appendix 11) The image forming method according to any one of Appendices 1 through 10, wherein a ratio (X/Y) of an applied amount (X) of the resin powder and an applied amount (Y) of the water-based ink is 0.04 or more and 240 or less. (Appendix 12) The image forming method according to any one of Appendices 1 through 11, wherein after the resin powder applying step, the image forming step is performed, and then the thermal fixing step is performed, while maintaining a resin powder state applied in the resin powder applying step. (Appendix 13) A method for manufacturing an image-formed article that includes an image forming step, wherein the image forming step is implemented using the image forming method according to any one of Appendices 1 through 12. (Appendix 14) An image forming system that includes an ink flow path, a resin powder housing section (a resin powder reservoir), ink applying means, and resin powder applying means, uses the resin powder applying means to apply resin powder housed in the resin powder housing section to an object to be subjected to image forming, uses the ink applying means to apply water-based ink supplied into the ink flow path to the object to be subjected to image forming so that the ink overlaps an area to which the resin powder was applied (the first area), and then supplies the water-based ink according to any one of Appendices 1 through 12 into the ink flow path.

As described above, with the image forming method according to the present disclosure, both pretreating trace evaluation and bleeding evaluation are excellent. The image forming method according to the present disclosure is broadly applicable for forming images on various types of objects to be subjected to image forming.

Obviously, numerous modifications and variations of the present invention(s) are possible in light of the above teachings. It is therefore to be understood that within the scope of the appended claims, the invention(s) may be practiced otherwise than as specifically described herein.

What is claimed is:

1. An image forming method comprising:
    applying a resin powder in a powder state to a first area of an object to be subjected to image forming;
    applying a water-based ink comprising pigments to a second area of the object by an inkjet method to form an image, the first area and the second area at least partially overlapping each other; and
    heating the first area and the second area to fix the resin powder and the water-based ink to the object,
    wherein, by contact with the resin powder, the water-based ink either thickens, or causes an aggregation of the pigments.

2. The image forming method according to claim 1, wherein the water-based ink comprises a water-soluble organic solvent which is liquid at a melting point of the resin powder.

3. The image forming method according to claim 2, wherein the water-soluble organic solvent in the water-based ink has a boiling point of 200° C. or more.

4. The image forming method according to claim 1, wherein one of the resin powder and the pigment is cationic, and the other is anionic.

5. The image forming method according to claim 4, wherein the resin powder is cationic, and the pigment is an anionic pigment.

6. The image forming method according to claim 5, wherein the water-based ink comprises a surfactant which is anionic.

7. The image forming method according to claim 1, wherein the water-based ink has a contact angle with respect to the resin powder of 50 degrees or more.

8. The image forming method according to claim 1, wherein the water-based ink comprises a fixing resin, and a solid content of the fixing resin relative to an amount of the water-based ink is 5 mass % or more.

9. The image forming method according to claim 1, wherein the first area and the second area are heated by a heating member, and a temperature of the heating member in the thermal fixing step is from 150 to 200° C.

10. The image forming method according to claim 1, wherein an applied amount of the resin powder is 0.1 mg/cm2 or more.

11. The image forming method according to claim 1, wherein a ratio (X/Y) of an applied amount (X) of the resin powder to an applied amount (Y) of the water-based ink is 0.04 or more and 240 or less.

12. The image forming method according to claim 1, wherein after applying the resin powder and before applying the water-based ink, the first area and the second area are not heated.

13. A method for manufacturing an image-formed article, comprising forming an image by the image forming method according to claim 1, to obtain the image-formed article.

14. An image forming system comprising:
    a water-based ink;
    an ink flow path configured to have the water-based ink pass therethrough;
    a resin powder;
    a resin powder reservoir configured to store the resin powder;
    a photoreceptor drum configured to apply the resin powder in a powder state, stored in the resin powder reservoir to a first area of an object to be subjected to image forming;
    an inkjet head configured to apply the water-based ink supplied into the ink flow path to a second area of the object, the first area and the second area at least partially overlapping each other; and
    a heater configured to heat the first area and the second area to fix the resin powder and the water-based ink to the object, wherein the water-based ink comprises pigments, and by contact with the resin powder, the water-based ink either thickens, or causes an aggregation of the pigments.

15. The image forming system according to claim 14, wherein the water-based ink comprises a water-soluble organic solvent which is liquid at a melting point of the resin powder.

16. The image forming system according to claim 15, wherein the water-soluble organic solvent in the water-based ink has a boiling point of 200° C. or more.

17. The image forming system according to claim 14 wherein one of the resin powder and the pigment is cationic, and the other is anionic.

18. The image forming system according to claim 17, wherein the resin powder is cationic, and the pigment is an anionic pigment.

19. The image forming system according to claim 18, wherein the water-based ink comprises a surfactant which is anionic.

20. The image forming system according to claim 14, wherein the water-based ink has a contact angle with respect to the resin powder of 50 degrees or more.

* * * * *